/

US008280958B2

(12) United States Patent  (10) Patent No.: US 8,280,958 B2
Chavez et al.  (45) Date of Patent: Oct. 2, 2012

(54) LIST PASSING IN A BACKGROUND FILE SHARING NETWORK

(75) Inventors: Timothy R. Chavez, Austin, TX (US); Lisa S. DeLuca, San Francisco, CA (US); Christina K. Lauridsen, Austin, TX (US); Sushma B. Patel, Austin, TX (US); Robert R. Peterson, Austin, TX (US); Loulwa F. Salem, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 436 days.

(21) Appl. No.: 12/501,704

(22) Filed: Jul. 13, 2009

(65) Prior Publication Data

US 2011/0010421 A1  Jan. 13, 2011

(51) Int. Cl.
*G06F 15/16* (2006.01)
(52) U.S. Cl. .......................................... 709/204; 707/10
(58) Field of Classification Search .................. 709/204, 709/205, 206
See application file for complete search history.

(56) References Cited

U.S. PATENT DOCUMENTS

| 5,337,044 | A | 8/1994 | Folger et al. |
| 7,203,741 | B2 | 4/2007 | Marco et al. |
| 7,617,178 | B2 | 11/2009 | Chavez et al. |
| 7,761,569 | B2 | 7/2010 | Hopkins |
| 7,788,711 | B1 | 8/2010 | Sun et al. |
| 7,822,711 | B1 | 10/2010 | Ranade |
| 2001/0037311 | A1 | 11/2001 | McCoy et al. |
| 2002/0055906 | A1 | 5/2002 | Katz et al. |
| 2002/0152299 | A1 | 10/2002 | Traversat et al. |
| 2002/0178255 | A1 | 11/2002 | Hobart |
| 2004/0024766 | A1 | 2/2004 | Chung |
| 2004/0059644 | A1 | 3/2004 | Blau |
| 2005/0203851 | A1 | 9/2005 | King et al. |
| 2006/0029093 | A1 | 2/2006 | Van Rossum |
| 2006/0123010 | A1 | 6/2006 | Landry et al. |
| 2006/0167855 | A1 | 7/2006 | Ishikawa et al. |
| 2006/0168318 | A1 | 7/2006 | Twiss |
| 2006/0173967 | A1* | 8/2006 | Jennings et al. .............. 709/208 |
| 2006/0179143 | A1 | 8/2006 | Walker et al. |

(Continued)

OTHER PUBLICATIONS

"A user-friendly,P2P-social-tagging-capable Wiki as part of Edgy Eft", https://features/launchpad.net/ubuntu/+spec/easy-to-use-wiki, printed Jun. 8, 2009, 2 pages.

(Continued)

*Primary Examiner* — Patrice Winder
*Assistant Examiner* — Tauqir Hussain
(74) *Attorney, Agent, or Firm* — Stephen R. Tkacs; Stephen J. Walder, Jr.; Steven L. Bennett

(57) ABSTRACT

A mechanism is provided for distributing file fragments in the background of a segmented peer-to-peer network using list passing between peers. Rather than trading actual content, peers may trade file names or file fragment identifiers. Upon receiving a new file name or identifier, a peer may request that file from the network, either in the background or the foreground. For example, once a client begins background file sharing in a swarm, the client may propagate file information for files it possesses to all or a portion of the peers in a swarm. Those clients then have the file information for a file without the user having to locate and specifically request that file. The file list may piggyback on a file fragment that is transferred as a result of a file sharing request.

17 Claims, 7 Drawing Sheets

U.S. PATENT DOCUMENTS

| | | | | |
|---|---|---|---|---|
| 2006/0190715 | A1 | 8/2006 | Miller | |
| 2006/0200736 | A1 | 9/2006 | Smit et al. | |
| 2006/0265436 | A1 | 11/2006 | Edmond et al. | |
| 2007/0088622 | A1 | 4/2007 | Floyd | |
| 2007/0088703 | A1 | 4/2007 | Kasiolas et al. | |
| 2007/0162308 | A1 | 7/2007 | Peters | |
| 2007/0180079 | A1 | 8/2007 | Wei et al. | |
| 2007/0208748 | A1 | 9/2007 | Li | |
| 2008/0016160 | A1* | 1/2008 | Walter et al. | 709/206 |
| 2008/0016194 | A1 | 1/2008 | Chetuparambil et al. | |
| 2008/0063003 | A1 | 3/2008 | O'Neal | |
| 2008/0133538 | A1* | 6/2008 | Chavez et al. | 707/10 |
| 2008/0133666 | A1* | 6/2008 | Chavez et al. | 709/205 |
| 2008/0133698 | A1* | 6/2008 | Chavez et al. | 709/217 |
| 2008/0133706 | A1* | 6/2008 | Chavez et al. | 709/218 |
| 2009/0106425 | A1 | 4/2009 | Zuckerman et al. | |
| 2009/0157902 | A1* | 6/2009 | Saffre et al. | 709/242 |
| 2010/0235432 | A1 | 9/2010 | Trojer | |

OTHER PUBLICATIONS

"SETI@home", University of California, 2006, http://setiathome.ssl.berkeley.edu/, 1 page.

"Tagged with "BitTorrent"", http://odeo.com/tags/bittorrent, printed Jun. 8, 2009, 3 pages.

"Tags / p2p", http://technorati.com/tag/p2p, printed Jun. 8, 2009, 2 pages.

"The Changing Face of BitTorrent", Computer Power User, Caught in the Web, vol. 5, Issue 11, Nov. 2005, http://www.computerpoweruser.com/Editorial/article/asp?guid=&article=articles/archive/c0511/46c11/46c11.asp/, 2 pages.

"Warner Bros. to sell firms via BitTorrent", The Associated Press, MSNBC.com, May 8, 2006, http://www.msnbc.msn.com/id/12694081/print/1/displaymode/1098/, May 8, 2006, 2 pages.

Clarke, Ian, "A Distributed Decentralised Information Storage and Retrieval System", University of Edinburgh, 1999, 45 pages.

Legout, Arnaud et al., "Rarest First and Choke Algorithms are Enough", ACM, Oct. 2006, 14 pages.

Appeal Brief filed with the USPTO on Oct. 26, 2010 for U.S. Appl. No. 11/566,835, 32 pages.

Office Action mailed Jan. 21, 2011 for U.S. Appl. No. 11/566,835; 12 pages.

Murasame, "A few things to consider while configuring Limewire for optimal performance . . . ", Posted on Gnutella forums by Murasame on Jul. 28, 2004.

USPTO U.S. Appl. No. 11/566,835, 2 pages.
USPTO U.S. Appl. No. 11/848,668, 2 pages.
USPTO U.S. Appl. No. 11/761,526, 2 pages.
USPTO U.S. Appl. No. 11/761,551, 2 pages.
USPTO U.S. Appl. No. 12/501,846, 2 pages.

Appeal Brief filed Apr. 21, 2010 for U.S. Appl. No. 11/761,526; 26 pages.

Examiner's Answer mailed May 19, 2010 for U.S. Appl. No. 11/761,526; 25 pages.

Notice of Allowance mailed Jun. 8, 2010 for U.S. Appl. No. 11/848,668; 8 pages.

Response to Office Action filed on Mar. 23, 2010 in USPTO U.S. Appl. No. 11/566,835; 20 pages.

Final Office Action mailed Jul. 5, 2011 for U.S. Appl. No. 11/566,835, 11 pages.

Response to Office Action filed Apr. 21, 2011; U.S. Appl. No. 11/566,835, 15 pages.

Office Action mailed Jun. 23, 2010 for U.S. Appl. No. 11/566,835; AUS920060765US1, 44 pages.

Reply Brief filed Jul. 19, 2010 for U.S. Appl. No. 11/761,526, 8 pages.

Interview Summary dated Sep. 23, 2011 for U.S. Appl. No. 11/566,835; 3 pages.

Notice of Allowance mailed Oct. 26, 2011 for U.S. Appl. No. 11/566,835; 23 pages.

Office Action mailed Aug. 25, 2011 for U.S. Appl. No. 12/501,846; 22 pages.

Response to Final Office Action filed Sep. 22, 2011, U.S. Appl. No. 11/566,835, 10 pages.

Notice of Allowance mailed Feb. 10, 2012 for U.S. Appl. No. 12/501,846; 16 pages.

Response to Office Action filed Nov. 23, 2011; U.S. Appl. No. 12/501,846, 16 pages.

USPTO U.S. Appl. No. 13/368,410, Feb. 23, 2012, 1 page.

Clarke, Ian et al., "Protecting Free Expression Online with Freenet", IEEE Internet Computing, 2002, 10 pages.

Cohen, Bram, "Incentives Build Robustness in BitTorrent", http://www.bittorrent.com/bittorentecon.pdf, May 22, 2003, pp. 1-5.

Cohen, Bram, "The BitTorrent Protocol Specification", http://www.bittorrent.org/beps/bep_0003.html, 2008, 6 pages.

Cooper, Mark, "Lamabox—the P2P Video set-top box", PVR Hardware Database, Jan. 19, 2006, http://pvrhw.goldfish.org/tiki-read_article.php?articleId=59, Jan. 19, 2006 , 2 pages.

Ernesto, "Tribler: A social based, BitTorrent powered p2p network", http://torrentfreak.com/tribler-a-socialbased-bittorrent-powered-p2p-network, Feb. 22, 2006, 9 pages.

Golle, Philippe et al., "Incentives for Sharing in Peer-to-Peer Networks", ACM Conference on Electronic Commerce (EC-2001), 2001, pp. 1-18.

Malik, OM, "BitTorrent does legal P2P with NTL", GigaOmniMedia, Inc., http://gigaom.com/2006/02/10/bittorrent-does-legal-p2p-with-ntl/, Feb. 10, 2006, 2 pages.

Pouwelse, J. A. et al., "Tribler: A social-based Peer-to-Peer system", http://iptps06.cs.ucsb.edu/papers/Pouw-Tribler06.pdf, The 5th International Workshop on Peer-to-Peer Systems, Santa Barbara, California, Feb. 27-28, 2006, 6 pages.

\* cited by examiner

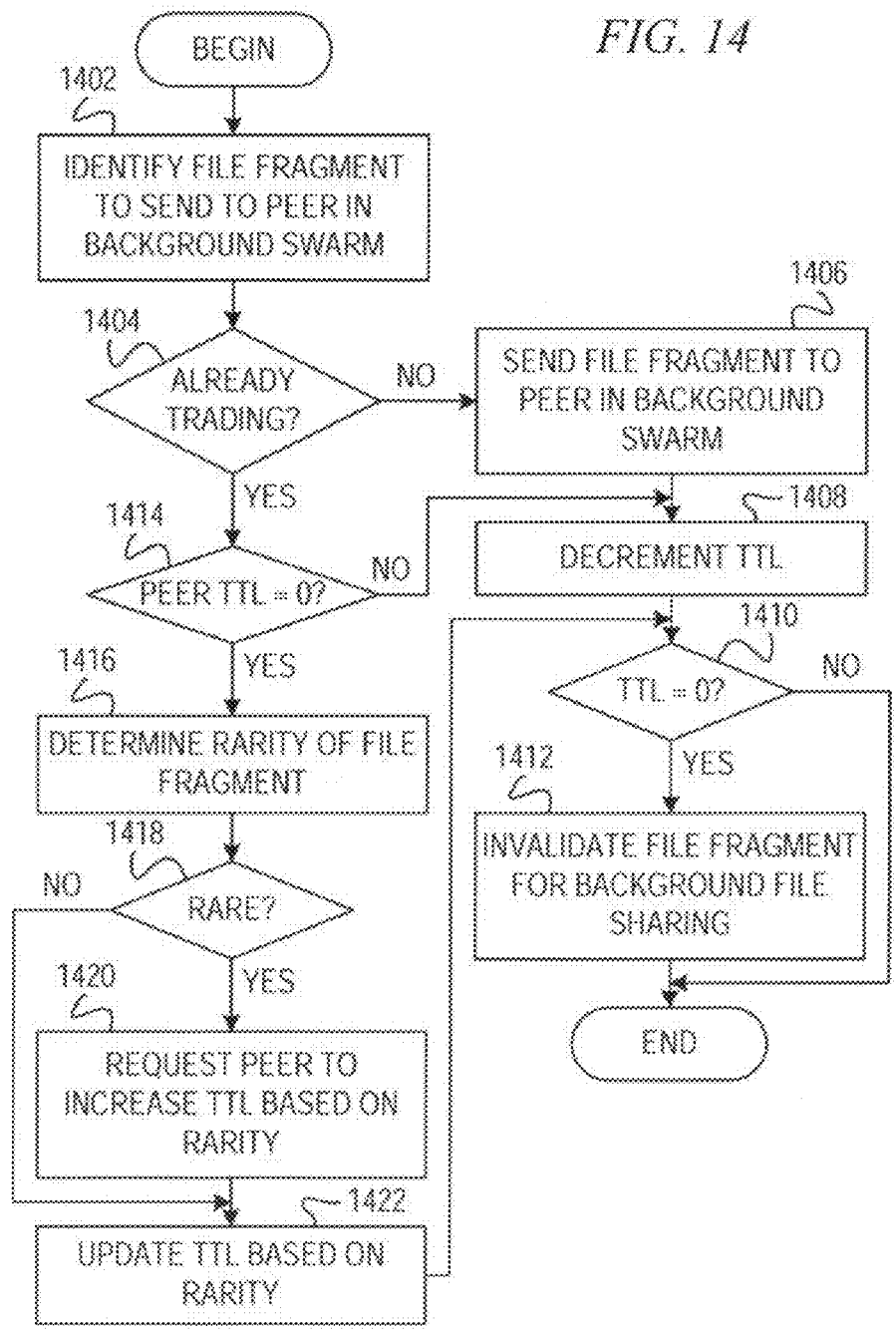

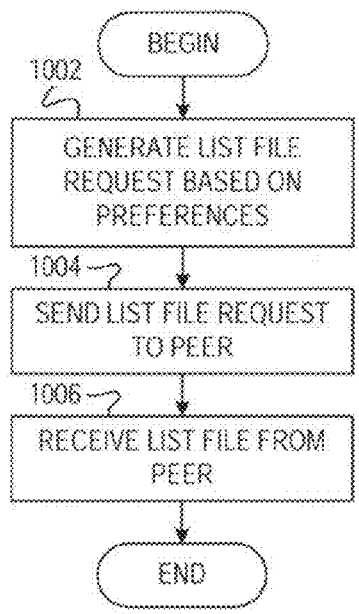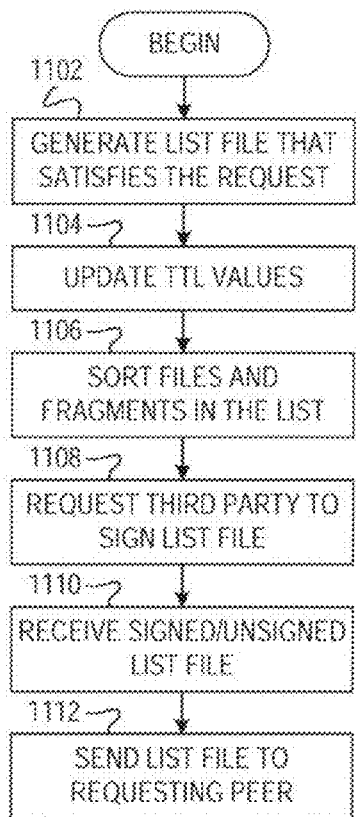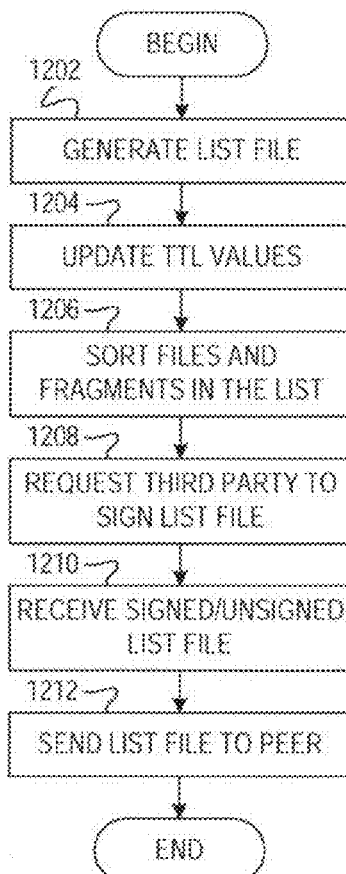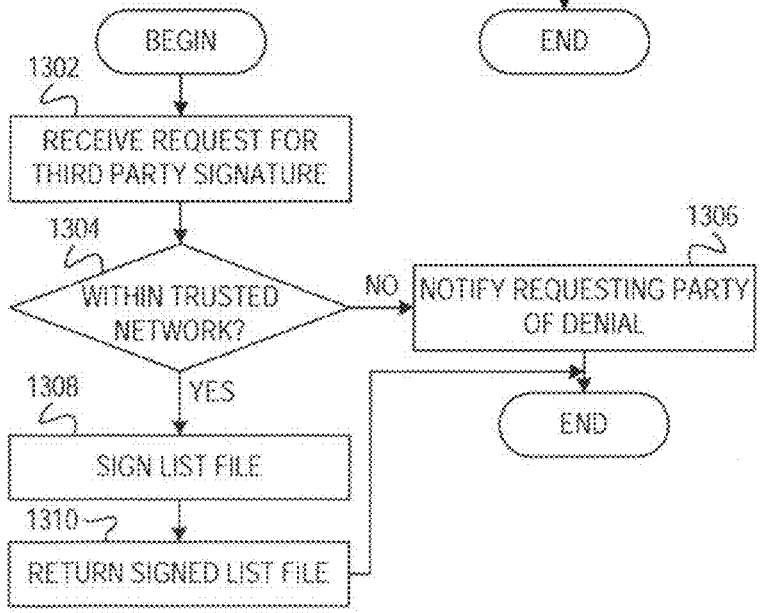

LIST PASSING IN A BACKGROUND FILE SHARING NETWORK

BACKGROUND

The present application relates generally to an improved data processing system and method. More specifically, the present application is directed to background file sharing in a segmented peer-to-peer file sharing network.

Peer-to-peer file sharing programs are designed to widely distribute large amounts of data, while minimizing costly server and bandwidth resources. Peer-to-peer (P2P) systems, such as the BITTORRENT P2P file sharing system, have gained a wide following. P2P systems have recently been put to commercial use through partnerships with content providers, such as media and cable companies. P2P networks are gaining credibility as a means for legal revenue generating activity—creating a need for methods to rapidly optimize content delivery.

In one implementation, a file is made available for P2P download by providing a link to file information, often stored on a hypertext transport protocol (HTTP), or Web, server. In the BITTORRENT file sharing system, this file information is referred to as a "torrent." The file information may include, for example, file name, file length, and hashing information.

The file information may also include the address of a tracker, which is a device in the P2P network that helps downloaders (peers) to find each other. Peers communicate with the host of the file information and the tracker using a simple protocol layered on top of HTTP. Each peer sends information about what file it is downloading, on what port it is listening, and other information. The tracker responds with a list of contact information for peers that are downloading the same file. However, the communication between a peer and a tracker requires much less bandwidth than a direct server-to-client file download.

In a typical P2P implementation, a file is divided into pieces of fixed size, e.g., 256 KB. Each downloader reports to its peers what pieces it has. Also, each downloader, at some point, uploads file pieces, also referred to as segments or fragments, to its peers. Whenever, a downloader finishes downloading a file fragment, the P2P client software performs a hash of the file fragment and compares the hash to an expected hash value, received in the file information, to determine if the file fragment downloaded correctly and has not been corrupted. If the file fragment downloads correctly, then the client reports to its peers that it has the file fragment available for upload.

At least one peer must start with the whole file. This peer is referred to as a "seed." Eventually other peers will possess the whole file, or at least every file fragment will be found on at least one client. Some peers may leave the network before possessing the whole file, while others may remain in the network well after completing retrieval of the file. The goal is to balance downloading clients with uploading clients.

Several techniques or policies may be used to ensure that it is possible to download the entire file. For example, the tracker may return a random list of peers to each new participant in the download. As another example, P2P clients may attempt to request the rarest file fragment first. As more peers request the rarest file fragment, another file fragment becomes the rarest, and so forth. This technique helps to equally distribute the demand for particular file fragments. Other techniques, such as "random first" and "endgame mode" may be used; however, they are not a focus of this disclosure and will not be discussed in detail.

Content distribution among peers increases in efficiency with the number of peers who are sharing that content on a network. A network of peers participating in distributing a particular file is referred to as a "swarm." Swarms are formed around the retrieval of a particular file and are comprised of peers retrieving (downloading) and sharing (uploading) file fragments simultaneously. The larger a swarm, the more likely a downloading peer is to have donating peers that are close by (i.e. with less network hops) facilitating a faster file download, and the more distributed the bandwidth cost becomes for each participant client device.

SUMMARY

In one illustrative embodiment, a method is provided in a peer-to-peer file sharing client for background file sharing in a peer-to-peer file sharing network using list passing. The method comprises generating a request for a list file for background file sharing, sending the request to a peer in a foreground swarm within the peer-to-peer file sharing network, receiving a list file from the peer in the foreground swarm, wherein the list file satisfies the request, and selecting a file fragment from the list file for background file sharing. The method further comprises requesting the selected file fragment from the peer in a background swarm for background file sharing, receiving the selected file fragment from the background swarm, and uploading the at least one file fragment to one or more peers in the background swarm. The at least one file fragment is part of a file that is not being downloaded in the foreground.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 9 depicts an example list file data structure in accordance with an illustrative embodiment;

FIG. 10 is a flowchart illustrating example operations of a peer-to-peer file sharing client pulling a file list in accordance with an illustrative embodiment;

FIG. 11 is a flowchart illustrating example operations of a peer-to-peer file sharing client responding to a list file pull request in accordance with an illustrative embodiment;

FIG. 12 is a flowchart illustrating example operations of a peer-to-peer file sharing client pushing a list file in accordance with an illustrative embodiment;

FIG. 13 is a flowchart illustrating example operations of a trusted third party in accordance with an illustrative embodiment; and FIG. 14 is a flowchart illustrating example operations of a peer-to-peer client performing background file sharing with list passing in accordance with an illustrative embodiment.

DETAILED DESCRIPTION

The illustrative embodiments provide a mechanism for distributing file fragments in the background of a segmented peer-to-peer network using list passing between peers. Rather than trading actual content, peers may trade file names or file fragment identifiers. Upon receiving a new file name or identifier, a peer may request that file from the network, either in the background or the foreground. For example, once a client begins background file sharing in a swarm, the client may propagate file information for files it possesses to all or a portion of the peers in a swarm. Those clients then have the file information for a file without the user having to locate and specifically request that file. The file list may piggyback on a file fragment that is transferred as a result of a file sharing request.

Figure 1:
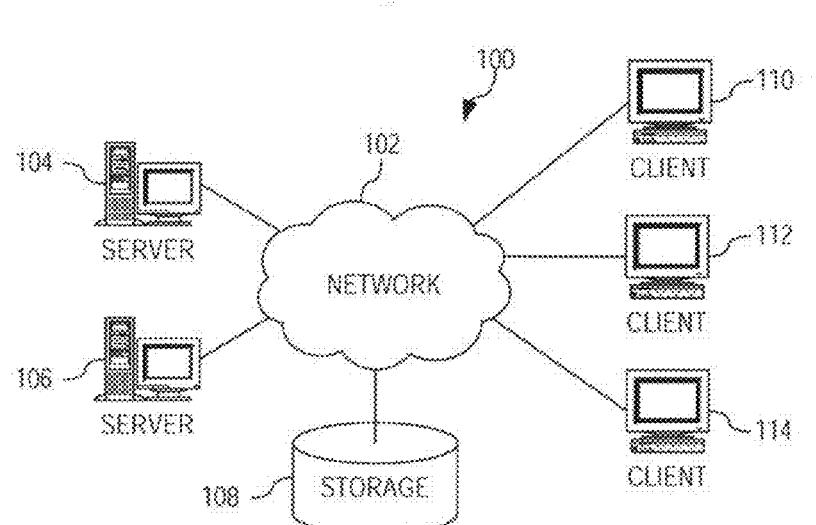
FIG. 1 depicts a pictorial representation of an example distributed data processing system in which aspects of the illustrative embodiments may be implemented.
Figure 2:
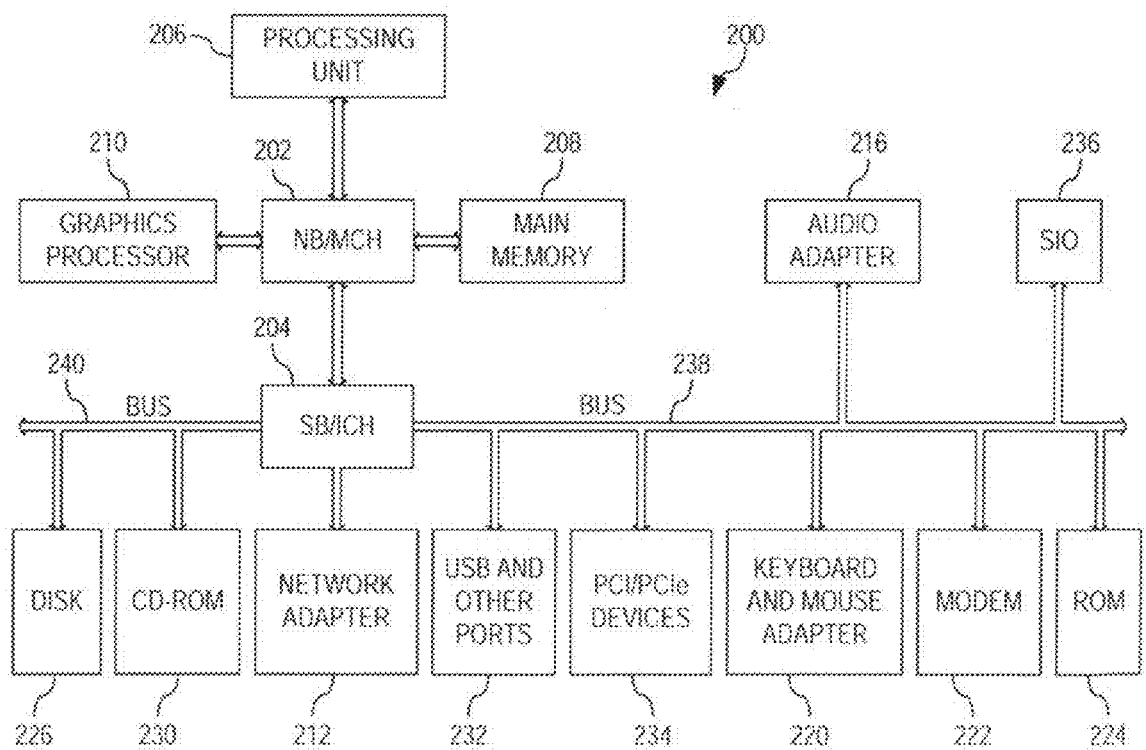
FIG. 2 is a block diagram of an example data processing system in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which example aspects of the illustrative embodiments may be implemented. While the description following FIGS. 1 and 2 will focus primarily on a single data processing device implementation, this is only example and is not intended to state or imply any limitation with regard to the features of the present invention. To the contrary, the illustrative embodiments are intended to include distributed data processing environments.

With reference now to the figures and in particular with reference to FIGS. 1 and 2, example diagrams of data processing environments are provided in which illustrative embodiments of the present invention may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which embodiments of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In one illustrative embodiment, server 104 may provide access to a Web page or other content that contains a link to file information for a given file. Server 106 may be a tracker for the file. Clients 110-114 may have peer-to-peer (P2P) file sharing clients that participate in downloading the given file. More particularly, clients 110 and 112 may already be members of a swarm, each downloading file fragments from and uploading file fragments to peers in the swarm. A user at client 114 may click on the link, which results in the P2P client software downloading file information including, for example, file name, file length, hashing information, and an address of the tracker at server 106. The address of the tracker may be a uniform resource locator (URL), for instance.

The P2P client software at client 114 may then contact the tracker at server 106, which, in turn, responds with addresses of clients 110, 112. Client 114 then establishes communication with clients 110, 112, and begins downloading file fragments. As client 114 downloads file fragments, it reports the file fragments it has available for upload to the other peers in the swarm.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

The efficiency of content distribution increases relative to the number of peers who are sharing that content. The peers are segmented in the file sharing network. Swarms are formed around the retrieval of a particular file. If the number of peers sharing a file is too low, then the number of peers having a given file fragment may be low as well. As a result, a P2P client that has a rare file fragment available for upload may receive a high number of requests for that file fragment, and the bandwidth is not ideally distributed among the peers. Increasing the number of peers in a swarm helps to more evenly distribute the bandwidth costs.

In accordance with the illustrative embodiments, a peer-to-peer file sharing system is provided in which participant clients make an amount of storage space and bandwidth available for background file sharing. That is, a P2P client may participate in a swarm even if the user of that client did not explicitly request that file. In this manner, swarms are grown without the need to advertise a file, through a Web site, for example. Peers may participate in a swarm by sharing file fragments in the background without attempting to possess the entire file.

Normally, in the prior art, a swarm is formed around a particular file out of want, or "pull," so the swarm is defined by all users wanting that file. However, in accordance with the illustrative embodiments, a swarm may also be formed based on storage space and bandwidth available for sharing information, either file fragments or some other information about the file. The net effect is a larger swarm, a higher density of participation, and more evenly distributed bandwidth costs.

With reference now to FIG. 2, a block diagram of an example data processing system is shown in which aspects of the illustrative embodiments may be implemented. Data processing system 200 is an example of a computer, such as server 104 or client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Figure 3:
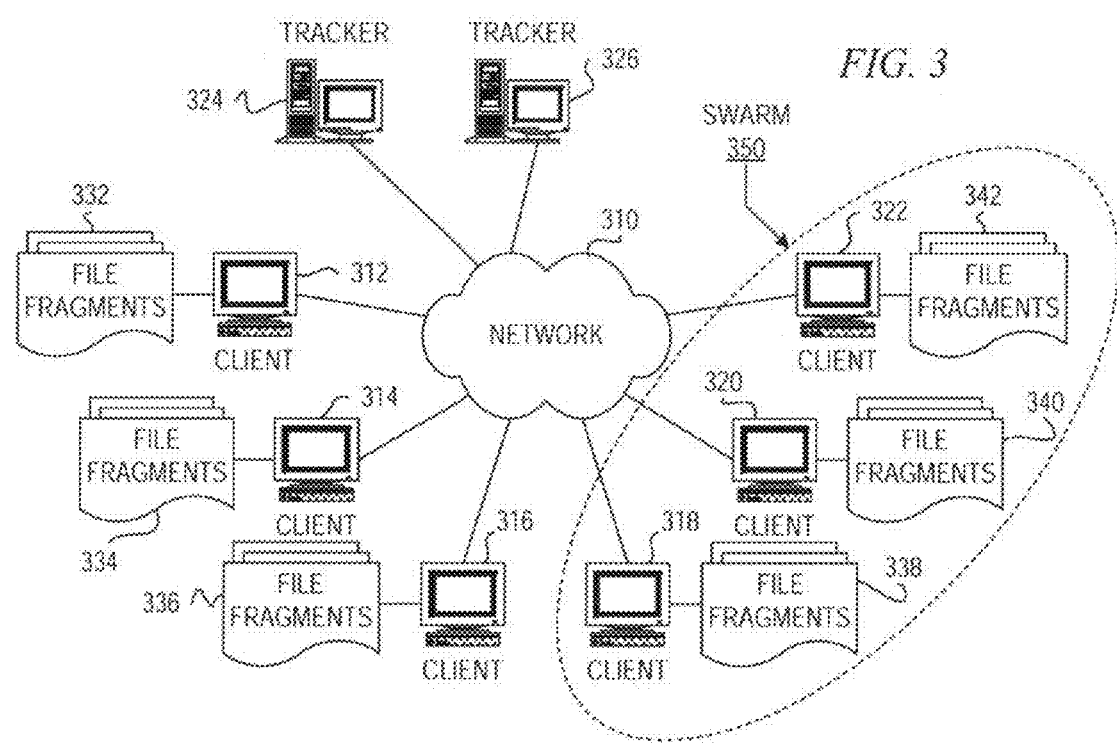
FIG. 3 depicts a pictorial representation of a segmented file sharing network in accordance with an illustrative embodiment.

FIG. 3 depicts a pictorial representation of a segmented file sharing network in accordance with an illustrative embodiment. Clients 312-322 are connected to network 310. Trackers 324, 326 are responsible for helping clients 312-322 find each other to form segmented networks, or "swarms," of peers for downloading/uploading particular files. Clients 312-322 possess file fragments 332-342, respectively.

In the depicted example, clients 318, 320, 322 are part of swarm 350. Clients 312, 314, 316 may be participants of other swarms. In accordance with an illustrative embodiment, clients 312, 314, 316 may provide bandwidth and storage space for background file sharing. That is, client 316, for instance, may take part in swarm 350 without a user at client 316 expressly requesting the file being distributed in swarm 350.

Figure 4:
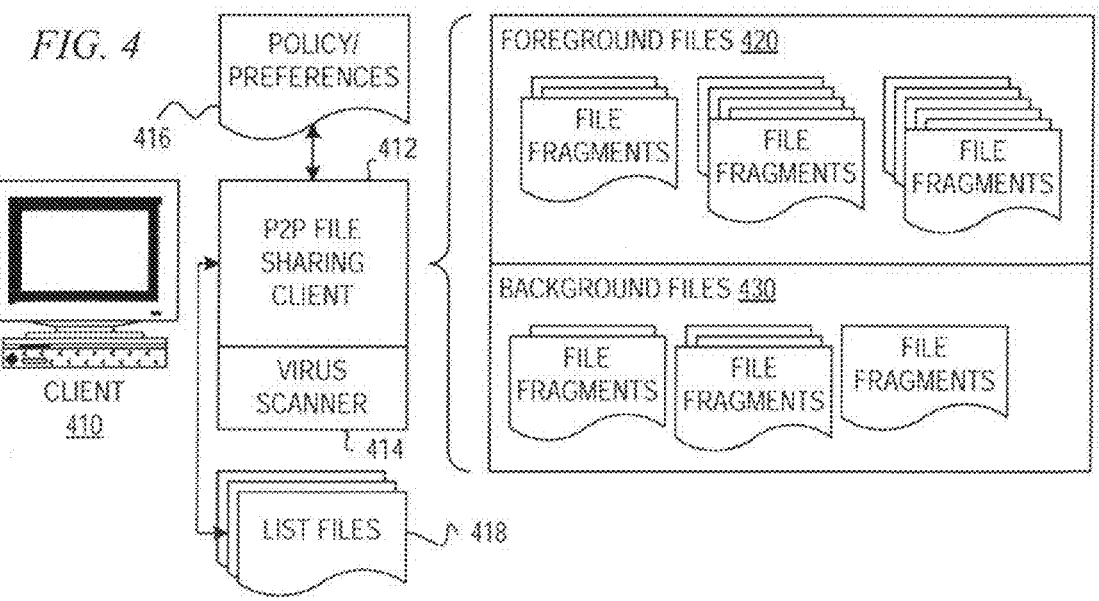
FIG. 4 is a block diagram illustrating a configuration of a peer-to-peer client with background file sharing in accordance with an illustrative embodiment.

FIG. 4 is a block diagram illustrating a configuration of a peer-to-peer client with background file sharing in accordance with an illustrative embodiment. Client 410 includes peer-to-peer (P2P) file sharing client 412 and virus scanner 414. When a user of client 410 selects a file for download, P2P client 412 contacts the tracker, receives a list of peers, and requests file fragments.

Files that are expressly requested by a user, or otherwise being of express interest to the user, are downloaded in the foreground. For example, a user may subscribe to a particular group, and, thus, may automatically retrieve files being shared by that group. As another example, the client may be programmed to retrieve any new episode of a particular video broadcast or any new music from a particular artist. File fragments for these files are stored in foreground files 420.

Note that content being distributed in the peer-to-peer network, as described herein, is managed content. P2P client 412 may include functionality for preventing illegal distribution or receipt of copyrighted content. For example, P2P client 412 may validate a digital signature of a file with a trusted third party. However, preventing illegal distribution is not a focus of this disclosure, and such functionality will not be discussed in detail.

In accordance with the illustrative embodiment, P2P client 412 also receives and shares file fragments in the background to grow swarms in which the user of client 410 is not expressly interested. In other words, P2P file sharing client 412 may automatically share file fragments without the user manually requesting the download. The user may not intend to view the content and does not need to monitor the background file sharing. P2P client 412 stores file fragments that are downloaded in the background in background files 430.

The file fragments in foreground files 420 are downloaded with the express purpose of possessing the entire file, although a user may cancel a download without ultimately possessing the entire file. On the other hand, the file fragments in background files 430 will likely never result in the entire file being downloaded. Rather, file fragments in background files 430 may be only the most rare file fragments, may expire after a specified period of time, or may remain small in number due to storage or bandwidth limits specified by the user.

For security, background files 430 may be a portion of storage that is partitioned to a defined space on a storage device within client 410, where it cannot be executed. Virus scanner 414 may be applied to background files 430, or perhaps all content within foreground files 420 and background files 430.

In one example embodiment, P2P file sharing client 412 may select peers based on protocol/client. When a downloader participates in a swarm, it receives information in the background, such that it can participate as a peer in other swarms. This may include all users of a particular P2P protocol or client. For example, if P2P file sharing client 412 is a BITTORRENT client, then P2P client 412 may participate with any other swarms it discovers, in the background, as long as the peers in the other swarms are BITTORRENT clients communicating using the BITTORRENT protocol.

In another embodiment, P2P file sharing client 412 may also select peers for background file sharing based on user-selected communities. Users may opt-in to support particular communities, rather than sharing files at random. For example, if the file sharing system encompasses a community of artists, the members of that community may use P2P file sharing to share high-resolution images and media of art with each other. A particular peer subscribed to the community may have pieces of all different media on the client device that are of no particular interest to the user, but the P2P client hosts those file fragments to help provide a high-quality distribution channel to everyone in the community.

P2P client 412 may have user-defined limits on the amount of storage and/or bandwidth available for background file sharing. Oldest file fragments, least recently requested file fragments, or least frequently requested file fragments may be overwritten such that the most relevant content is always available within a limited storage space.

P2P client 412 may also allow the user to select trusted peers. The P2P file sharing system may then build trust among peers, for example, by sharing a list of trusted peers that can be modified by each client according to their relationships. Users may also build lists of peers that are known to be malicious (blacklist).

Information about the policy and preferences under which P2P file sharing client 412 operates may be stored in policy/preferences data structure 416. Thus, policy/preferences data structure 416 may store security policies or preferences, peer selection policies or preferences, storage/bandwidth limits, a list of trusted peers, or a list of blacklisted peers, as described above.

P2P clients may participate in the distributed background file sharing network using list passing. In one illustrative embodiment, P2P file sharing client 412 may store one or more list files 418 to keep track of files and file fragments in background files 430. Rather than merely transferring file fragments to peers in the background arbitrarily, or purely based on rarity, P2P file sharing client 412 may keep track of the files and file fragments that are stored in background files 430 within list files 418. Thus, when a peer requests a file fragment to share in the background, P2P file sharing client 412 may send list files 418 to that peer, which may then select a specific file fragment from the list. List files 418 may contain information about the fragments P2P file sharing client 412 has to offer and/or information regarding the foreground swarm to which P2P file sharing client 412 belongs. List files 418 may be flat files containing metadata about individual file fragments (much like a torrent file contains metadata about an entire file).

Typically, P2P file sharing client 412 will place emphasis on those file fragments that are most rare in its foreground swarm. To ensure that the most rare file fragments are correctly advertised, peers within the swarm may sync the rarity rating of the file fragments with the tracker, and update list files 418 as necessary. P2P file sharing client 412 may order list files 418 in some fashion, e.g., by rarity or some other priority. P2P file sharing client 412 may determine order by policy/preferences 416, identity of the recipient peer, or type of request sent by the recipient peer, for example.

Furthermore, P2P file sharing client 412 may store list files 418 including lists from other peers. Thus, P2P file sharing client 412 may request a file fragment from a peer's list. In addition, P2P file sharing client 412 may consult a peer's list file to determine whether the peer is already trading a file fragment before pushing that file fragment to the peer.

P2P file sharing client 412 may explicitly request ("pull") list files 418 from other peers through an augmentation of the P2P protocol. For example, P2P file sharing client 412 may send a handshake message to a peer to request the peer's list file. The request protocol may include specifications on what type of fragments the requesting peer is interested in, for example, most rare, most recently traded, particular genre or community, particular source identity, source identity associated with a particular group or social networking criteria, match to particular tagging criteria, etc.

P2P file sharing client 412 may also send ("push") its list file from list files 418, allowing the recipient peer the chance to make a selection for a file fragment according to the list file. P2P file sharing client 412 may "piggyback" its list file on a file fragment it is uploading to a recipient peer in the foreground swarm. P2P file sharing client 412 may impose a maximum or minimum length to its list file. Alternatively, the tracker may impose a global setting for the maximum list length.

P2P file sharing client 412 may also consolidate list files 418 to distribute a more comprehensive file fragment list for all peers with which it is trading file fragments. Metadata information in list files 418 may include the location of the tracker for each segment. Peers may use this information to update the tracker with new background segments they possess. For example, if P2P file sharing client 412 attempts to get segment 52 of chai-tea-recipe.pdf from a peer because it is the rarest file fragment in the list, P2P file sharing client 412 may then tell the tracker that it has this file fragment too, even though it received the file fragment via background file sharing, and the tracker may direct peers attempting to download chai-tea-recipe.pdf to download that file fragment from P2P file sharing client 412.

In a friendly or controlled network, P2P file sharing client 412 may associate a "time to live" (TTL) value with each fragment. Each time P2P file sharing client 412 distributes a fragment (whether in its own foreground swarm or a background swarm), P2P file sharing client 412 decrements the TTL value associated with that file fragment. The fragment may then be invalidated for background file sharing when its TTL value reaches zero. P2P file sharing client 412 may delete invalidated file fragments to conserve storage space.

Another less subtle implication of this behavior is that the TTL value is less for each subsequent recipient. Thus, the more peers distributing the file fragment, the less rare the fragment, and hence distributing it is a poor utilization of background file sharing resources.

If P2P file sharing client 412 attempts to offer the same fragment to a recipient that is currently trading the fragment or has already invalidated the fragment, P2P file sharing client 412 may determine whether the file fragment is no longer rare. If the file fragment is no longer rare, it will then attempt to offer a different file fragment. Otherwise, P2P file sharing client 412 may ask the peer to increase the TTL value of the file fragment so that the peer will continue to distribute the fragment. P2P file sharing client 412 may determine the rarity of the file fragment by retrieving lists from other peers in the swarm and comparing the TTL value, or another value that indicates rarity of the file fragment, or by updating its list from a central location, such as the tracker.

When P2P file sharing client 412 goes offline, P2P file sharing client 412 may notify all peers for which it has collected lists that the segments it is serving will slightly increase in rarity. Then, when P2P file sharing client 412 comes back online at some future point in time, P2P file sharing client 412 may then contact peers that it knows of to update their list and also update the rarity of all segments in its own list.

Figure 5:
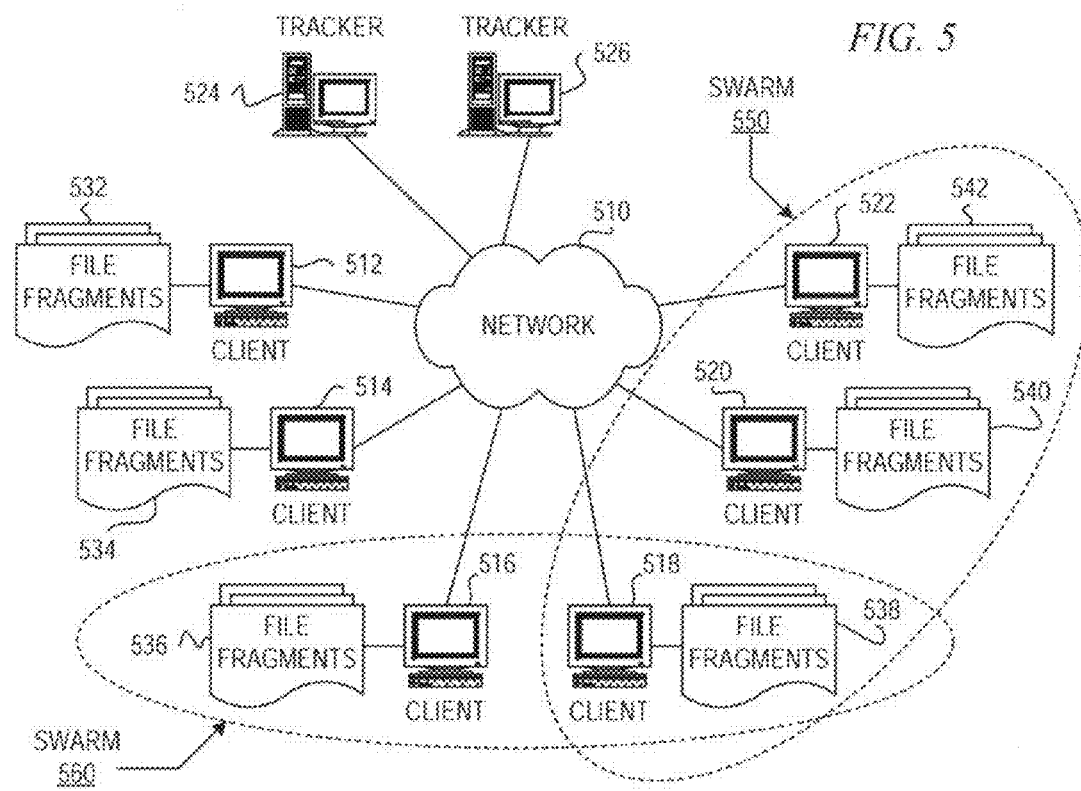
FIG. 5 depicts a pictorial representation of a segmented file sharing network with background file sharing in accordance with an illustrative embodiment.

FIG. 5 depicts a pictorial representation of a segmented file sharing network with background file sharing in accordance with an illustrative embodiment. Clients 512-522 are connected to network 510. Trackers 524, 526 are responsible for helping clients 512-522 find each other to form segmented networks, or "swarms," of peers for downloading/uploading particular files. Clients 512-522 possess file fragments 532-542, respectively.

In the depicted example, clients 518, 520, 522 are part of swarm 550. In addition, clients 516, 518 are part of swarm 560. Clients 512-522 maybe participants of other swarms. In accordance with an illustrative embodiment, client 516 may provide bandwidth and storage space for background file sharing. That is, client 516, for instance, may take part in swarm 550 without a user at client 516 expressly requesting the file being distributed in swarm 550.

What files, or file fragments, are shared in the background can vary based on the community model utilizing the background file sharing technique of the illustrative embodiments. In one example embodiment, a central server and/or provider (not shown) may record and control where files and file fragments exist on the network. This central provider may send commands to peers 512-522 indicating which files to request from other peers in the network in order to increase swarm size, especially for more popular files.

In another example embodiment, the distribution method allows peers 512-522 to trade file segments based on the rarity of the segments in each swarm. In this case, the actual information being distributed among peers is the file itself. When a peer joins a swarm, it begins retrieving the file and sharing it with other peers at the same time. When a peer receives a piece of the file, it exchanges a piece of another file in the background based on the rarity of the piece it received. For example, in exchange for receiving a file fragment that is N rare from client 520, client 516 may trade 5 file fragments that are each N/5 rare. More specifically, client 516 would offer 5 fragments each N/5 rare that are not on the list of client 520; therefore, there would likely be a list exchange, as discussed below, prior to the selection of fragments for an equal trade. In an alternative embodiment, P2P clients may share file fragments without considering the rarity of the file fragments. For example, P2P clients may share file fragments at random or based on relative/comparable size.

In a community where the swarms (and files) are contained and controlled, file fragments given to a peer in the background are likely to be relevant and useful to another peer. For example, in P2P file sharing system within a work environment, there is a high probability that files or file fragments shared in one swarm will be relevant to another swarm. In any event, how often a trade for file fragments is performed between two peers is trivial as long as another swarm is able to gain a peer with which the swarm may share at least one piece. A background P2P client may want to diversify its fragments according to swarms; therefore, the P2P client may want to first ensure a certain percentage of fragments from each swarm are stored (e.g. from a community) before storing based on rarity.

Once a background peer receives a small number of file fragments, that peer will likely only be uploading in the background; it will not be receiving in that swarm until it can assist the swarm with other rare file fragments. For example, client 516 may receive and host a small number of rare file fragments for swarm 550. Client 516 will not receive any more file fragments for swarm 550 until those file fragments expire, are no longer rare, or peers in swarm 550 drop out of the swarm leaving even rarer file fragments. Alternatively, client 516 may receive and host a small number of file fragments until they expire, and then cease background file sharing in swarm 550 altogether, for example.

In fact, a peer sharing in the background may also share parts of the swarm in which it is participating in the foreground, automatically increasing the size of its own swarm. For instance, client 516 may host file fragments for background file sharing in swarm 550; however, clients 518-522 may also host file fragments for swarm 560 to grow the size of that swarm. If both swarms are the same size, background file sharing may nearly double the size of both swarms.

Background file fragments may expire after a given amount of time or contribution percentage. The background may be fully configurable by the peer to control how much space can be used for background sharing, how much bandwidth can be used for background sharing, how much of a file can be shared in the background, a minimum rarity for file fragments to be hosted in the background, number of background swarms in which to participate, etc.

Presumably, the P2P file sharing protocol or client algorithm may dictate that the rarest pieces of a swarm are to be sent to the background peers to make them less rare. The first link between two swarms may be made by at least one peer that is "intentionally" interested in both swarms. That peer, the user of which requests both files, may then propagate background sharing information (file information) to the other peers in both swarms.

Rather than trading actual content, peers may trade file names or file fragment identifiers. Upon receiving a new file name or identifier, a peer may request that file from the network, either in the background or the foreground. For example, once client 516 begins background file sharing in swarm 550, client 516 may propagate file information for files it possesses to all or a portion of the peers in swarm 550. Those clients now have the file information for a file without the user having to find that file advertised on a Web site, for example.

Each peer must know which files, or file fragments, to download in the background. One way to distribute this information is to pass a list between peers in the network that is populated with the names of the files that currently reside on each user's local system. Once a peer receives the list from another peer, it may select files or fragments from the list to request from the list sender or from all connected peers in that swarm. The file list could piggyback onto a file fragment that is transferred as a result of a manual client request.

Alternatively, a P2P client may pass a list of files to download based on known rare segments or popular files within the network. Rather than passing a list of files on the peer systems, the list may contain file fragments that were rarest at the time of a previous download. Alternatively, the list may contain identifiers of files recently requested by peers with counters that increase when more than one peer who has held the list has recently requested the same content. These lists may be based on manual user requests or on background requests. Each client may manipulate the list and pass it on. In an alternative embodiment, the list may be sent by a tracker to a peer.

In another example embodiment, the P2P client may share files based on similar files shared within the swarm. Similar to Web sites that provide "users who purchased X also purchased Y" information, the P2P client may share files in the background according to correlated features, such as "artist" for music or a download timestamp within a certain range. When a user manually requests a file, background sharing may be initiated for files that are in some way correlated to that file. Those file fragments are likely to also be requested within that given swarm.

In yet another example embodiment, a P2P client may share files using file lists obtained from a peer file-list-swap or a central provider (not shown). Peers may determine which files to request for background download based on pattern matching between a user attribute or timestamp and a particular data sequence in the file name. Matching strings could include particular bit sequences contained in either the original strings or hashes/checksums of the original strings.

Figure 6:
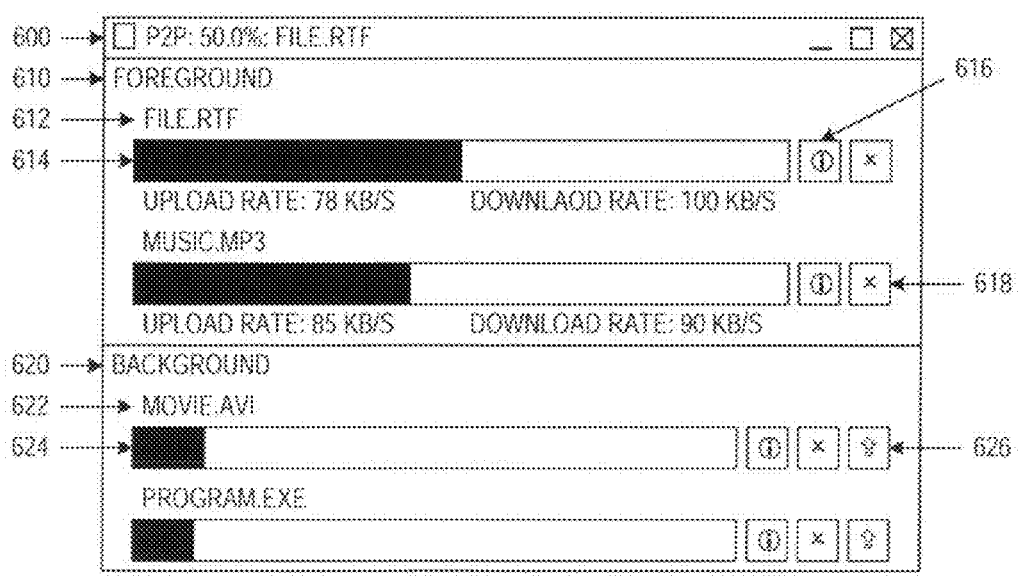
FIG. 6 depicts an example screen of display for a peer-to-peer client with background file sharing in accordance with an illustrative embodiment.

FIG. 6 depicts an example screen of display for a peer-to-peer client with background file sharing in accordance with an illustrative embodiment. Peer-to-peer (P2P) client window 600 includes a foreground download portion 610 and a background portion 620.

Foreground portion 610 presents files that are being downloaded in the foreground, e.g. files that were expressly requested by a user of the P2P client. For each file, foreground download portion 610 presents file name 612 and progress bar 614. Also for each file being downloaded in the foreground, portion 610 presents an information control 616 and a cancel control 618. Responsive to the user selecting information control 616, the P2P file sharing client may present information about the file, such as the file name, file size, and so forth. Responsive to the user selecting cancel control 618, the P2P file sharing client may cease downloading of the file; however, the client may continue to upload file fragments it possesses to the peers in the swarm.

Background portion 620 presents files that are being downloaded in the background. For each file, background portion 620 presents a file name 622 and a progress bar 624. In one embodiment, progress bar 624 may present the progress with respect to the file size; however, background downloads are very unlikely to result in the entire file being downloaded. In fact, the purpose of background file sharing is to host a small number of rare file fragments for upload without a significant amount of download from the swarm. Therefore, progress bar 624 may represent other information, such as the percentage of background storage space used for the file, the percentage of background bandwidth used for uploading, contribution percentage, progress toward expiration, rarity information of file fragments, etc.

In addition to information and cancel controls, background portion 620 may also present a foreground control 626. The user of the P2P file sharing client may view the file information and may wish to possess the entire file. The user may then select foreground control 626, responsive to which the P2P client may move the file from background portion 620 to foreground download portion 610. The P2P client may then move the file fragments it possesses to foreground storage and begin requesting file fragments until the client possesses the entire file.

Figure 7:
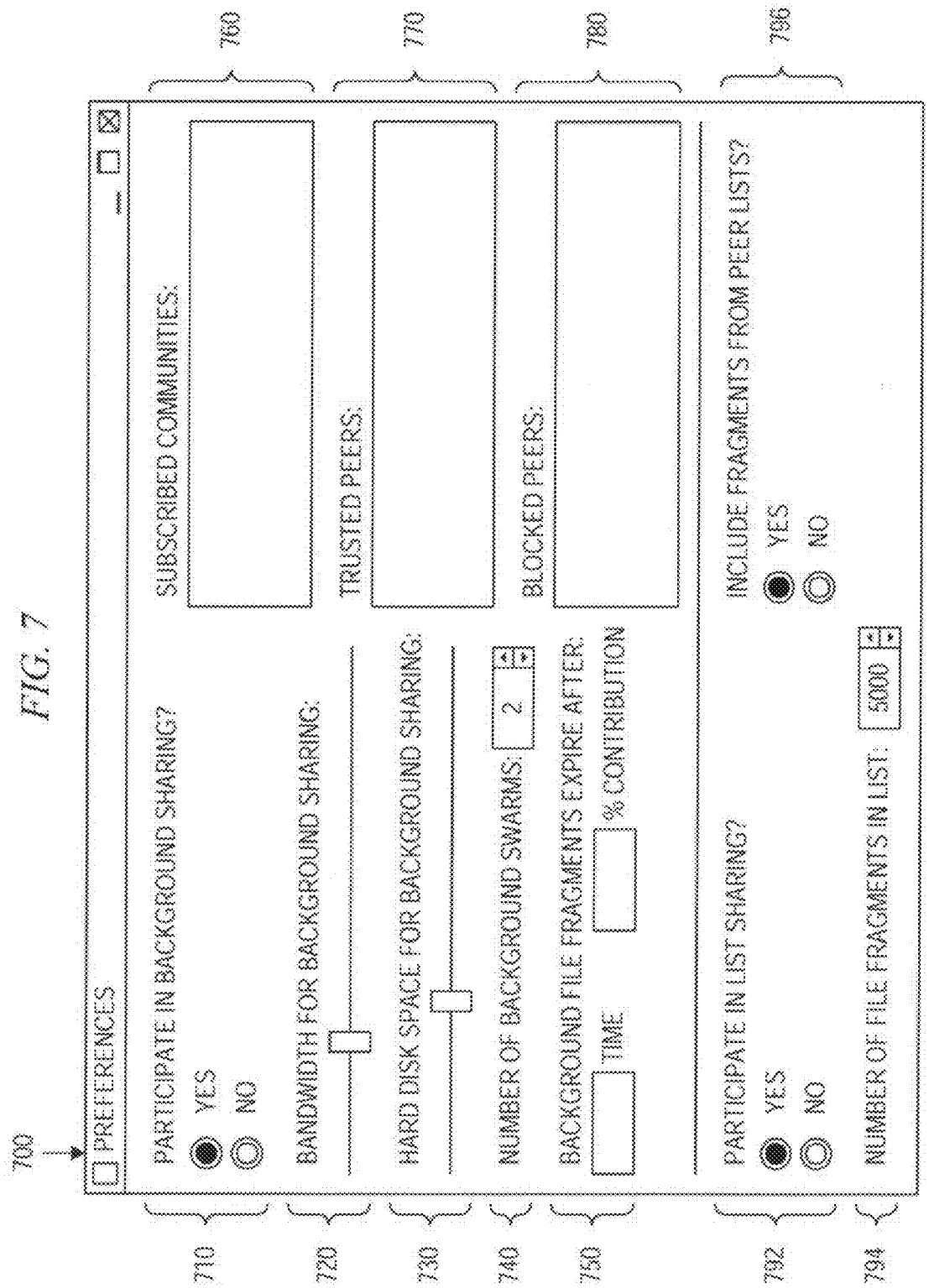
FIG. 7 depicts an example screen of display for a preferences user interface in accordance with an illustrative embodiment.

FIG. 7 depicts an example screen of display for a preferences user interface in accordance with an illustrative embodiment. Preferences user interface dialog 700 presents controls that allow a user to enter policy and preferences information to control the behavior of a peer-to-peer (P2P) file sharing client.

In the depicted example, control portion 710 presents a radio button control with which the user may opt-in or opt-out of background file sharing. If the user selects the "No" radio button in control portion 710, then the P2P file sharing client will not participate in background file sharing. In this instance, the "Yes" radio button is selected.

Control portion 720 presents a slider control with which the user may specify an amount of bandwidth to be used for background file sharing. Although a slider control is shown, other user interface controls may be used, such as text fields, dial controls, and the like. Alternatively, the amount of bandwidth to be used for background file sharing may be determined dynamically, based on an amount of bandwidth used for foreground file sharing, bandwidth used for other applications, time of day, whether the client device is idle, and so forth.

Control portion 730 presents a slider control with which the user may specify an amount of disk space to be used for background file sharing. Although a slider control is shown, other user interface controls may be used, such as text fields and the like. Alternatively, the amount of disk space to be used for background file sharing may be determined dynamically, perhaps in conjunction with the specified amount, based on the amount of available disk space, the amount of disk space used for foreground file sharing, etc.

Control portion 740 presents an input control with which the user may specify a number of background swarms allowed. Alternatively, the number of background swarms may be determined dynamically, perhaps in conjunction with the specified number, based on the number of foreground swarms, the amount of processing resources being used for other applications, and the like.

Control portion 750 presents controls with which the user may specify expiration parameters for background file fragments. The user may specify expiration parameters in units of time or according to percentage of contribution. Alternatively, the P2P client may expire background file fragments using other parameters, such as most commonly available in the swarm, least recently requested, least frequently requested, and so forth.

Control portion 760 presents an input control with which the user may specify communities to which the user subscribes. Thus, the user may subscribe to a community of musicians or amateur film makers, and whenever a file is being distributed in a specified community, the P2P client may participate in background file sharing to help grow the swarms for those communities. The user may enter the names of the communities directly using text, or may use other selection controls that are generally known in the art.

Control portion 770 presents an input control with which the user may specify a list of trusted peers. The user may enter the names, usernames, addresses, or the like of trusted users, such as friends or co-workers, for example. Thus, when one of the trusted peers begins sharing files in a swarm, the P2P client may participate in background file sharing to help grow the swarms for the trusted peers. The user may enter the names, usernames, addresses, etc. of trusted peers directly using text, or may use other generally known selection controls.

Control portion 780 presents an input control with which the user may specify a list of blocked peers. The user may enter the names, usernames, addresses, or the like of users that are known to provide malicious or illegal content, for example. Thus, when the P2P client participates in background, or foreground, file sharing to grow a swarm, the client may refuse to receive file fragments from or provide file fragments to peers in the blocked peers list. The user may enter the names, usernames, addresses, etc. of blocked peers directly using text, or may use other generally known selection controls.

Control portion 792 presents a radio button control with which the user may opt-in or opt-out of list sharing. If the user selects the "No" radio button in control portion 792, then the P2P file sharing client will not participate in list sharing. In this instance, the "Yes" radio button is selected. Control portion 794 presents an input control with which the user may specify a maximum number of files or file fragments to include in the list. The P2P file sharing client may then limit the size of the list being passed to peers. The P2P file sharing client may order the list according to one or more priorities, such as own foreground file fragments first, rarity, and so forth.

Control portion 796 presents a radio button control with which the user may indicate whether to include file fragments from other peers in the list being passed. If "Yes" is selected, the P2P file sharing client may consolidate lists from a plurality of peers. If "No" is selected, then the user may wish to emphasize sharing its own file fragments. In other words, the P2P file sharing client may participate in background file sharing and list passing, but may not propagate the lists of other peers via list passing.

FIG. 7 is intended as an example and is in no way comprehensive. Preferences user interface dialog 700 may alternatively include settings for list piggybacking, list distribution only mode (e.g., the background client proactively helps distribute/negotiate rare segments to other peers, but does not download segments itself), virus scan settings, and so forth.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In addition, the program code may be embodied on a computer readable storage medium on the server or the remote computer and downloaded over a network to a computer readable storage medium of the remote computer or the users' computer for storage and/or execution. Moreover, any of the computing systems or data processing systems may store the program code in a computer readable storage medium after having downloaded the program code over a network from a remote computing system or data processing system.

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 8:
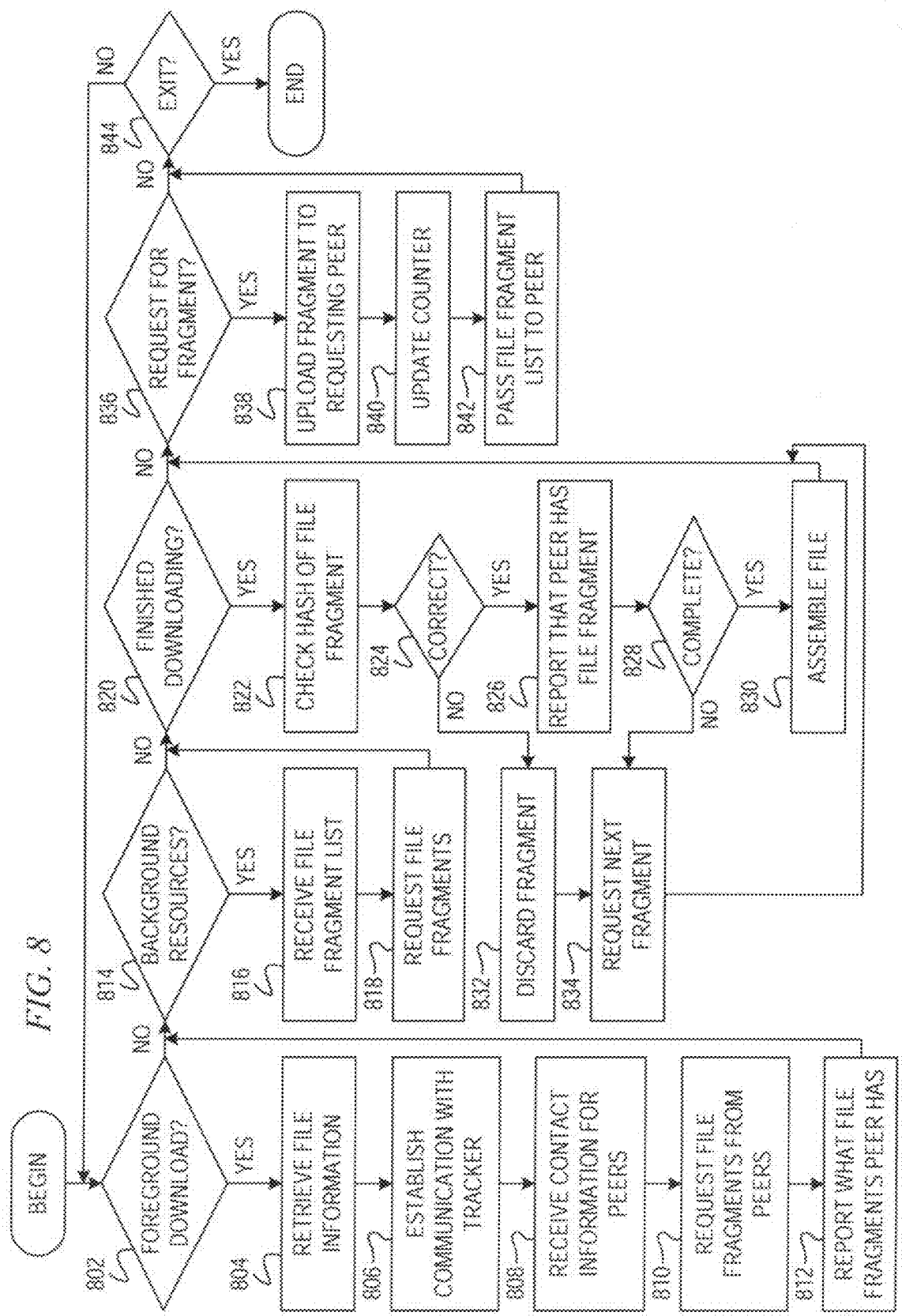
FIG. 8 presents a flowchart illustrating operation of a peer-to-peer file sharing client with background file sharing in accordance with an illustrative embodiment.

Referring now to FIG. 8, this figure provide flowcharts outlining example operations of a peer-to-peer file sharing client with background file sharing in accordance with an illustrative embodiment. Operation begins, and the peer-to-peer (P2P) client determines whether a foreground download is initiated by the user (block 802). The user may initiate a foreground download, for example, by selecting a link to file information, such as a torrent. If the P2P client determines that a foreground download is initiated, the client retrieves the file information (block 804), establishes communication with the tracker (block 806), and receives a list of contact information for peers (block 808). Then, the P2P client requests file fragments from one or more of the peers (block 810). The P2P client reports to the peers in the swarm what file fragments it possesses (block 812).

Thereafter, or if the P2P client determines that a foreground download is not initiated in block 802, the P2P client determines whether storage space and bandwidth are available for background file sharing (block 814). If background storage and bandwidth resources are available, the P2P client receives file fragment list from peers (block 816). The P2P client may request a file fragment list from peers; however, the file fragment list may be piggybacked on file fragments in a foreground download. It is impractical for the client to fetch a list from every conceivable peer. Therefore, the P2P client may contact a subset of random peers from all the swarms it is servicing. From these lists, the P2P client may pick the rarest segments and begin downloading them. After the download of a segment is complete, the P2P client may notify the source peer to update its list to rate the segment with slightly less rarity and add the segment to its own list.

The file fragment list may be based on file name trading, files that each peer possesses, known rare file fragments or popular files, similar files within a swarm, or pattern matching, as described above. Alternatively, as described in further detail above, the P2P client may receive a list of file fragments based on rarity of file fragments, randomly selected file fragments, or file fragments with relative or comparable size to those being shared by the P2P client. In another alternative embodiment, the P2P client may receive the file fragment list from a central server or provider, as disclosed above. Given a list of file fragments that may be shared in the background, the P2P client requests file fragments from peers (block 818). The number of file fragments the P2P client may request to share in the background may be based on an amount of background storage space or bandwidth available, rarity of the file fragments, and so forth.

Thereafter, or if the P2P client determines that background storage or bandwidth resources are not available in block 814, the P2P client determines whether a file fragment is finished downloading (block 820). This may be a foreground file fragment or a background file fragment, because the P2P client will treat the downloading of individual file fragments the same. If a file fragment is finished downloading, the P2P client performs a hash on the file fragment (block 822) and determines whether the resulting hash value is correct (block 824). The P2P client determines whether the hash value is correct based on hash information received in block 804 or in the file fragment list received in block 816. If the hash value is correct, the P2P client reports to the peers in the swarm that it has the file fragment (block 826) and adds the file fragment to its list.

Thereafter, the P2P client determines whether download of the entire file is complete (block 828). It is likely that the P2P client will completely download a file if the file is part of foreground file sharing; however, it may be possible to download an entire file in background file sharing, especially if the P2P client is not currently participating in any foreground file sharing, for instance. However, for background file sharing, it is likely that the client does not care if the entire file is downloaded, and it is unlikely that the entire file will be downloaded. Therefore, the P2P client may only determine whether download of the entire file is complete for foreground file sharing. If the file download is complete, the P2P client assembles the file (block 830).

Returning to block 824, if the hash is not correct for the file fragment, the P2P client discards the file fragment (block 832) and requests a next file fragment (block 834). In addition, although not illustrated here, the P2P client may automatically add the peer from which the file fragment was received to a blocked peer list after a specified number of invalid file fragments. With reference to block 828, if the file download is not complete, the P2P client requests a next file fragment (block 834).

After assembling the file in block 830 or requesting a next file fragment in block 834, or if the client determines that a file fragment is not finished downloading in block 820, the P2P client determines whether a request for a file fragment is received (block 836). This request may be for a file fragment being shared in the foreground or the background, because the P2P client may treat the uploading of file fragments the same regardless of whether the file fragment is being shared in the foreground or background. Alternatively, the P2P client may give precedence to requests for file fragments being shared in the foreground or may apply other techniques, such as satisfying requests in order of rarity, for example. If a request is received for a file fragment, the P2P file sharing client uploads the requested file fragment to the requesting peer (block 838). Then, the P2P client may update a counter (block 840) to keep track of the rarity of file fragments or the popularity of files. The P2P client may also pass a file fragment list to the requesting peer (block 842). This file fragment list may include a list of the file fragments that the client possesses, a list of the rarest file fragments, a list of popular files, a correlation of files, or other file names or identifiers, as described in further detail above.

Thereafter, or if the P2P client determines that a request for a file fragment is not received in block 836, the P2P client determines whether an exit condition exists (block 844). An exit condition may exist, for example, if the user closes the P2P file sharing client, if the client device shuts down or loses connection to the P2P file sharing network, etc. If an exit condition exists, operation ends. Otherwise, if an exit condition does not exist in block 844, operation returns to block 802 to determine whether a foreground download is initiated.

FIG. 9 depicts an example list file data structure in accordance with an illustrative embodiment. Each entry in list file 900 may include a fragment ID, a file name for the file, a file extension for the file, a rarity score for the file fragment, a time-to-live value, tags associated with the file, a tracker ID, and a source peer ID. List file 900 is represented as a table; however, other list file data structures may also be used. For example, a list file may be a delineated file structure, a linked list, or a markup language file. More specifically, a list file may be an extensible markup language (XML) file, for instance. List file 900 may be sorted by some selection criteria, such as rarity score, for example.

In one example embodiment, list file 900 may include one entry that has a highest rarity score and another entry that has a highest TTL value. The P2P file sharing client may assign, or have assigned by another entity such as the tracker, a high TTL value for a particular file fragment, because the P2P file sharing client is responsible for distributing that particular file fragment. Therefore, list file 900 may be sorted by TTL value in this embodiment.

FIG. 10 is a flowchart illustrating example operations of a peer-to-peer file sharing client pulling a file list in accordance with an illustrative embodiment. Operation begins, and the peer-to-peer (P2P) client generates a list file request based on preferences (block 1002). The request may specify types of fragments to include in the list file. For example, the P2P client may generate the request to specify file fragments that are most rare, most recently traded, from a particular genre, from a particular source identity, from a source identity associated with a particular group or social network criteria, matching particular tagging criteria, and so forth. The P2P client then sends the list file request to the peer (block 1004) and receives the resulting list file from the peer (block 1006). Thereafter, operation ends.

FIG. 11 is a flowchart illustrating example operations of a peer-to-peer file sharing client responding to a list file pull request in accordance with an illustrative embodiment. Operation begins when the peer-to-peer (P2P) client receives a list file request. The P2P client generates a list file that satisfies the request (block 1102). Then, the P2P client updates time-to-live (TTL) values in the list file (block 1104). Initially, the P2P client sets the TTL value for each fragment to an initial value, such as 255, for example. The initial TTL value may be configurable in the profile or preferences of the P2P client. A higher TTL value allows a file fragment to be distributed to more peers. Alternatively, the P2P client may determine the initial TTL value based on rarity. Thus, a rare file fragment will have a higher TTL value than a file fragment that is not rare.

The P2P client then sorts the files and fragments in the list (block 1106). The P2P client may sort file fragments according to priority set at time of passing. The P2P client may determine the sort order based on a local profile or preferences, identity of the requesting peer, or type of request. For example, the P2P client may place its own foreground file fragments at the top of the list. The P2P client may simply sort the list in descending order of rarity. The P2P client may also limit the length of the list in block 1106.

The P2P client then requests a trusted third party to digitally sign the list file (block 1108). Peers may be configured to only share file fragments in a background swarm if the file fragment is from a list that is signed by a trusted third party. If a peer has file fragments it is attempting to share via background file sharing that are outside of a trusted network of peers or offers file fragments that cannot be verified, the trusted third party may deny the request. Peers may be configured to not request file fragments for foreground or background file sharing from an unsigned list. Thus, the P2P client then receives the signed or unsigned list file (block 1110) and sends the list file to the requesting peer (block 1112). Thereafter, operation ends.

FIG. 12 is a flowchart illustrating example operations of a peer-to-peer file sharing client pushing a list file in accordance with an illustrative embodiment. Operation begins when the P2P client pushes a list file to a peer, such as by piggybacking the list file on a file fragment. The P2P client generates the list file (block 1202). The P2P client updates the TTL values for the file fragments in the list file (block 1204). The P2P client sorts the files and file fragments in the list (block 1206). The P2P client requests a trusted third party to digitally sign the list file (block 1208) and receives the signed or unsigned list file (block 1210). The P2P client then sends the list file to the peer (block 1212), and operation ends.

FIG. 13 is a flowchart illustrating example operations of a trusted third party in accordance with an illustrative embodiment. Operation begins, and the trusted third party receives a request for third party signature for a list file (block 1302). The trusted third party examines the list file and determines whether all file fragments are able to be verified as belonging within a trusted network (block 1304). If the trusted third party determines that one or more file fragments are from outside the trusted network, or cannot be verified, then the trusted third party notifies the requesting party of denial (block 1306), and the list file remains unsigned. Thereafter, operation ends.

If the trusted third party determines that all of the file fragments are from within a trusted network in block 1304, the trusted third party signs the list file (block 1308), and returns the signed list file to the requesting party (block 1310). Thereafter, operation ends.

FIG. 14 is a flowchart illustrating example operations of a peer-to-peer client performing background file sharing with list passing in accordance with an illustrative embodiment. Operation begins, and the P2P client identifies a file fragment to send to a peer in a background swarm (block 1402). The P2P client determines whether the peer is already trading the file fragment (block 1404). The P2P client may make this determination by consulting a file list for the peer.

If the peer is not already trading the file fragment, the P2P client sends the file fragment to the peer in the background swarm (block 1406). When the P2P client first receives a file fragment, it initializes a time-to-live value for the file fragment based on its rarity, local profile or preferences, a setting in the tracker, or the TTL value at the sending peer. Thus, when the P2P client sends the file fragment to the peer, it may pass the TTL value, or a derivative, to the peer as well. The P2P client then decrements the TTL value for the file fragment in its file list (block 1408). Alternatively, the P2P client may decrement the TTL value before sending the file fragment to the peer.

Then, the P2P client determines whether the TTL value is zero (block 1410). If the TTL value reaches zero, then the P2P client invalidates the file fragment for background file sharing (block 1412), and operation ends. If the TTL value is not zero in block 1410, then the file fragment is still rare, and operation ends without invalidating the file fragment.

Returning to block 1404, if the peer is already trading the file fragment, the P2P client determines whether the TTL value for the file fragment at the peer is zero (block 1414). If the TTL value for the file fragment is not zero at the peer, then the file fragment is still rare. In this case, operation proceeds to block 1408 where the P2P client decrements the TTL value and determines whether the file fragment is now invalid.

If the TTL value for the file fragment is zero at the peer in block 1414, the P2P client determines the rarity of the file fragment (block 1416). The P2P client may make this determination by comparing TTL values, or another value that indicates rarity of the file fragment, or by updating its list from a central location, such as the tracker. Then, the P2P client determines whether the file fragment is still sufficiently rare for background file sharing (block 1418). If the file fragment is still sufficiently rare, the P2P client requests the peer to increase the TTL of the file fragment based on the determined rarity (block 1420). Then, the P2P client updates the TTL locally based on the rarity (block 1422), and operation proceeds to block 1410 to determine whether the TTL value reaches zero.

If the P2P client determines that the file fragment is not sufficiently rare for background file sharing in block 1418, operation proceeds to block 1422 where the P2P client updates the TTL value locally based on the determined rarity. The P2P client may update the TTL value by determining a new TTL value or by simply setting the TTL value to zero to invalidate the file fragment for background file sharing. Thereafter, operation proceeds to block 1410 to determine whether the TTL value is zero.

Thus, the illustrative embodiments provide mechanisms for distributing file fragments in the background of a segmented peer-to-peer network using list passing between peers. Rather than trading actual content, peers may trade file names or file fragment identifiers. Upon receiving a new file name or identifier, a peer may request that file from the network, either in the background or the foreground. For example, once a client begins background file sharing in a swarm, the client may propagate file information for files it possesses to all or a portion of the peers in a swarm. Those clients then have the file information for a file without the user having to locate and specifically request that file. The file list may piggyback on a file fragment that is transferred as a result of a file sharing request.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a peer-to-peer file sharing client for background file sharing in a peer-to-peer file sharing network using list passing, the method comprising:
generating a request for a list file for background file sharing;
sending the request to a peer in a foreground swarm within the peer-to-peer file sharing network;
receiving a list file from the peer in the foreground swarm, wherein the list file satisfies the request and wherein the list file includes a time-to-live value for each file fragment in the list file;
selecting a file fragment from the list file for background file sharing;
requesting the selected file fragment from the peer in a background swarm for background file sharing;
receiving the at least one file fragment from the background swarm;
uploading the at least one file fragment to one or more peers in the background swarm, wherein the at least one file fragment is part of a file that is not being downloaded in the foreground;
identifying an upload file fragment to send to a given peer in the background swarm;
responsive to a determination that the given peer is not already trading the upload file fragment based on the list file, uploading the upload file fragment to the given peer in the background swarm, decrementing a time-to-live value associated with the upload file fragment responsive to uploading the upload file fragment to the given peer in the background swarm, and responsive to a determination that the time-to-live value reaches zero, invalidating the upload file fragment for background file sharing;
responsive to a determination that the peer is already trading the upload file fragment based on the list file and that a time-to-live value associated with the upload file fragment in the list file is zero, determining whether the upload file fragment is rare; and
responsive to determining the upload file fragment is rare, requesting the peer to increase the time-to-live value associated with the upload file fragment at the peer.

2. The method of claim 1, wherein the request specifies file fragments that are most rare, most recently traded, from a specified genre, from a specified source identity, from a source identity associated with a specified group, or matching particular tagging criteria.

3. The method of claim 1, wherein selecting a file fragment from the list file comprises selecting a file fragment from the list file responsive to a determination that the list file is signed by a trusted third party.

4. The method of claim 1, further comprising:
receiving a list file request for a list file for background file sharing from a requesting peer;
generating a result list file that satisfies the list file request; and
returning the result list file to the requesting peer.

5. The method of claim 4, wherein generating a result list file comprises:
setting a time-to-live value for each file fragment in the result file list; and
sorting the result list file.

6. The method of claim 5, wherein sorting the result list file comprises sorting file fragments in the result list file in descending order of rarity.

7. The method of claim 4, wherein generating a result list file comprises:
requesting a third party to digitally sign the result list file; and
responsive to a determination that the trusted third party digitally signed the result list file, receiving the digitally signed result list file from the trusted third party.

8. The method of claim 1, further comprising:
generating a list file; and
piggybacking the generated list file on a file fragment being uploaded to a peer in the foreground swarm.

9. The method of claim 1, wherein each entry in the list file comprises at least one of a fragment identification, a file name, a file extension, a rarity score, a time-to-live value, tags, a tracker identification, or a source peer identification.

10. The method of claim 1, wherein selecting the file fragment from the list file for background file sharing comprises selecting the file fragment based on rarity, a time-to-live value, sorting order, tags, or filename patterns.

11. A computer program product comprising a computer recordable medium having a computer readable program recorded thereon, wherein the computer readable program, when executed on a computing device, causes the computing device to:
generate a request for a list file for background file sharing;
send the request to a peer in a foreground swarm within the peer-to-peer file sharing network;
receive a list file from the peer in the foreground swarm, wherein the list file satisfies the request;
select a file fragment from the list file for background file sharing;
request the selected file fragment from the peer in a background swarm for background file sharing;
receive the at least one file fragment from the background swarm;
upload the at least one file fragment to one or more peers in the background swarm, wherein the at least one file fragment is part of a file that is not being downloaded in the foreground;
identify an upload file fragment to send to the peer in the background swarm;
responsive to a determination that the peer is not already trading the upload file fragment based on the list file, upload the upload file fragment to the peer in the background swarm, decrement a time-to-live value associated with the upload file fragment responsive to uploading the upload file fragment to the given peer in the background swarm, and responsive to a determination that the time-to-live value reaches zero, invalidate the upload file fragment for background file sharing;
responsive to a determination that the peer is already trading the upload file fragment based on the list file and that a time-to-live value associated with the upload file fragment in the list file is zero, determine whether the upload file fragment is rare; and
responsive to determining the upload file fragment is rare, request the peer to increase the time-to-live value associated with the upload file fragment at the peer.

12. The computer program product of claim 11, wherein the computer readable program further causes the computing device to:
receive a list file request for a list file for background file sharing from a requesting peer;
generate a result list file that satisfies the list file request; and
return the result list file to the requesting peer.

13. The computer program product of claim 11, wherein the computer readable program further causes the computing device to:

generate a list file; and piggyback the generated list file on a file fragment being uploaded to a peer in the foreground swarm.

14. An apparatus, comprising:

a processor; and a memory coupled to the processor, wherein the memory comprises instructions which, when executed by the processor, cause the processor to:

generate a request for a list file for background file sharing;

send the request to a peer in a foreground swarm within the peer-to-peer file sharing network;

receive a list file from the peer in the foreground swarm, wherein the list file satisfies the request;

select a file fragment from the list file for background file sharing;

request the selected file fragment from the peer in a background swarm for background file sharing;

receive the at least one file fragment from the background swarm; upload the at least one file fragment to one or more peers in the background swarm, wherein the at least one file fragment is part of a file that is not being downloaded in the foreground;

identify an upload file fragment to send to the peer in the background swarm; and responsive to a determination that the peer is not already trading the upload file fragment based on the list file, upload the upload file fragment to the peer in the background swarm, decrement a time-to-live value associated with the upload file fragment responsive to uploading the upload file fragment to the given peer in the background swarm, and responsive to a determination that the time-to-live value reaches zero, invalidate the upload file fragment for background file sharing;

responsive to a determination that the peer is already trading the upload file fragment based on the list file and that a time-to-live value associated with the upload file fragment in the list file is zero, determine whether the upload file fragment is rare; and responsive to determining the upload file fragment is rare, request the peer to increase the time-to-live value associated with the upload file fragment at the peer.

15. The apparatus of claim 14, wherein the instructions further cause the processor to:

receive a list file request for a list file for background file sharing from a requesting peer;

generate a result list file that satisfies the list file request; and return the result list file to the requesting peer.

16. The computer program product of claim 12, wherein generating a result list file comprises:

setting a time-to-live value for each file fragment in the result file list; and sorting the result list file by time-to-live value.

17. The apparatus of claim 15, wherein generating a result list file comprises:

setting a time-to-live value for each file fragment in the result file list; and sorting the result list file by time-to-live value.

\* \* \* \* \*